June 15, 1926.

F. N. MARTIN 1,588,599

ICE CREAM DIPPER

Filed Oct. 17, 1925

Inventor
Fred N. Martin

By Herbert E. Smith
Attorney

Patented June 15, 1926.

1,588,599

UNITED STATES PATENT OFFICE.

FRED N. MARTIN, OF SPOKANE, WASHINGTON.

ICE-CREAM DIPPER.

Application filed October 17, 1925. Serial No. 62,993.

My present invention relates to an improved ice cream dipper especially adapted for cutting a hemispherical portion or section of ice cream from a bulk of cream and depositing the separated section of ice cream in a cone, dish, or other receptacle.

The primary object of the invention is the provision of a device of this character which may be manipulated with facility to cut out a portion of ice cream and then eject the cut portion from the dipper in such manner as to prevent waste and also to present a clean cut portion or section of cream capable of maintaining its attractive appearance.

In carrying out my invention I utilize a rigid, preferably circular cutting head having a shank, stem and handle or knob, which parts carry pivoted cutting jaws, a pivoted ejector, and separate operating means for the cutting jaws and ejector. These parts are combined and arranged compactly and operate with facility for the performance of the functions of the device, and as a minimum number of parts are employed in the device it is capable of being manufactured at comparatively low cost.

In the accompanying drawings I have illustrated one complete example of the physical embodiment of my invention wherein the parts are combined and arranged in accordance with the best mode I have thus far devised for the practical application of the principles of my invention.

Figure 1:
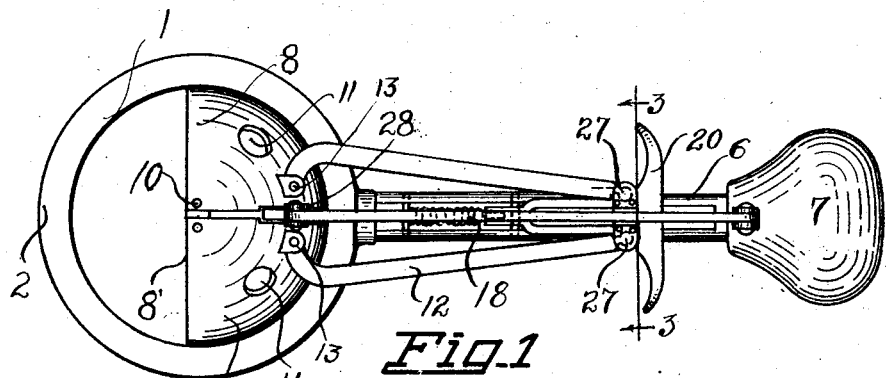
Figure 1 is a plan view of the device of my invention, the parts being in position for use.

The dipper is designed to be plunged into a bulk of ice cream, cut out a hemispherical section therefrom, and means are provided for ejecting this cut section through the cutting head of the device.

The cutting head is in the form of an open circular blade or ring 1 of suitable metal and fashioned with a forward cutting edge 2 that is plunged into the bulk of ice cream. An arch bar 3 is rigidly attached to the circular cutting head and extends transversely thereof and transversely to the direction of the line of plunging movement of the dipper. This arch bar is semi-circular in shape and has its ends rigidly attached to the open circular cutting head, with the front portion of the bar beveled to form a cutting edge 4.

The cutting head is fashioned with a hollow shank 5 which terminates in a round stem 6, which parts are preferably integral, and on the end of the stem is fixed a knob or handle 7 which is grasped by the hand with the knob resting in the palm thereof. The head, shank, stem and knob thus form a rigid and substantial structure for manipulating the device and a support for the operating parts of the device.

In combination with the cutting head I employ a pair of cutting jaws 8 and 9, which are pivoted at 10 to the arch bar 3 with their edges parallel with and retained within the inner periphery of the open, circular cutting head 1. The two jaws form a pocket or mold, when in normal position, full lines Figure 1, for fashioning one half of the ice cream dipped from the bulk, and they are adapted to swing on their pivots 10 to dotted line position in Figure 2 to cut the remaining half of the dipped section. Each jaw is fashioned in the shape of a quadrant of a hemisphere, and their forward edges 8' are beveled to form cutting edges for cleanly severing the portion of ice cream from its bulk. The jaws thus swing on pivots disposed perpendicular to the plane of the ring 1 or cutting head, and they are provided with vent holes 11 for air to insure ready release of the cut ice cream section when it is to be ejected from the dipper.

Figure 2:
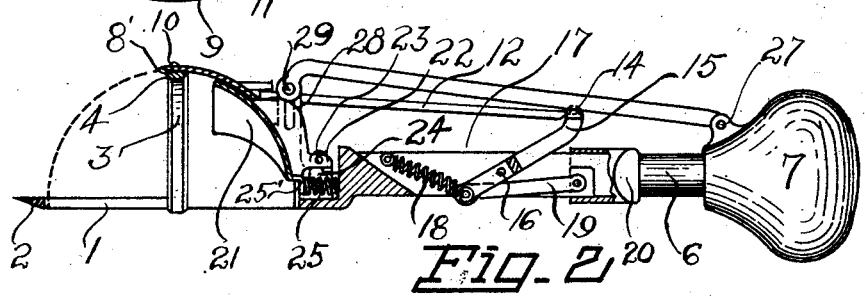
Figure 2 is a longitudinal sectional view through the operating parts of the device, showing by dotted lines the position of the cutting jaws at the end of their cutting stroke.
Figure 3:
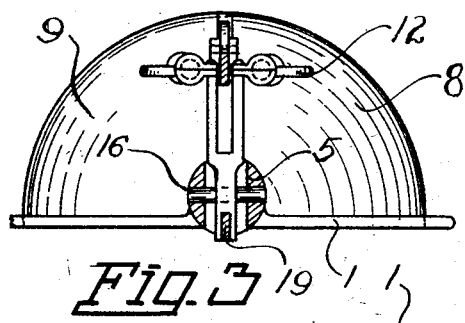
Figure 3 is an enlarged view transversely of the device as at the section line 3—3 of Figure 1.

By an inspection of Figure 1 it will be observed that the two jaws are manipulated to swing from their normal position at the right side of the circular head to the left side of this head, the jaw 8 to swing in anti-clockwise direction and the jaw 9 swinging in clockwise direction so that their cutting edges will meet on the line of the longitudinal axis of the device.

For accomplishing this swinging movement or working stroke of the cutting jaws

I employ a pair of complementary operating links 12 having their ends pivoted at 13 to the two jaws. These links extend rearwardly of the device and their rear ends are pivoted at 14 to a lever arm 15 which is pivoted at 16 and located in a slot 17 of the shank 5. The pivot pin 16 extends transversely of the shank and the lever 15 has one arm pivoted to the links while its other arm is connected to one end of a spring 18, which spring at its other end is anchored to the body of the shank within the slot 17. The spring thus holds the two jaws in normal position of Figure 1 and returns the jaws to this normal position after they have been operated to cut the ice cream. The two links act as push links for the working stroke of the jaws and the pushing movement is accomplished through the use of a draw link 19 locked in the slot 17 of the shank and pivoted to the lower or inner arm of the lever 15. The draw link is pivotally connected to a draw head 20 which slides on the stem 6 and is fashioned so that it may be gripped by two fingers of the hand that grasps the knob 7. Thus with the knob as a support for plunging the cutting head into the bulk of ice cream, it also forms a support for the hand when the draw bar is manipulated by exertion of the fingers to complete the cutting of the hemispherical section of ice cream. After the segment of ice cream has been cut the fingers are released from the draw head as the dipper is withdrawn from the bulk of ice cream and the spring 18 returns the jaws to their normal position. The dipper may now be manipulated to position for ejecting the segment of ice cream into a cone or other receptacle, and the segment is ejected through the opening in the cutter head 1.

I employ an ejecting plate 21 which conforms to the interior shape of the cutting jaws and normally lies against the inner sides of the jaws at the joint of their adjoining edges. The plate is provided with a lug 22 exterior of the jaws and a pivot pin 23 is passed through this lug and through a pair of perforated ears 24 rigid with the shank 5. A spring 25 is located in a pocket in the shank and bears against an abutment 25' on the ejector plate to retain the plate in normal position, and to return it to this position after the ejection of the segment of ice cream.

Figure 4:
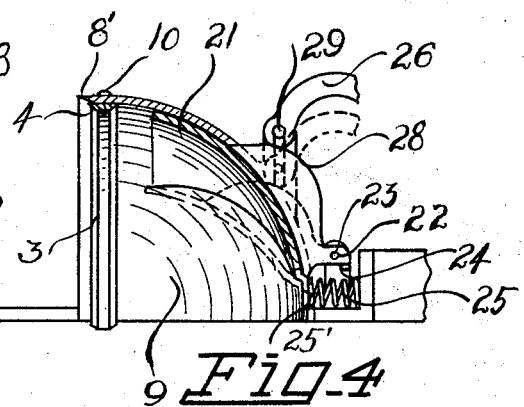
Figure 4 is a detail sectional view of the cutting end of the dipper, taken longitudinally of the device.
Figure 5:
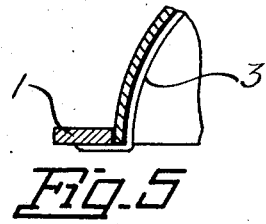
Figure 5 is a detail sectional view showing the relation of the circular cutting head, its arch bar and one of the cutting jaws.

The ejecting plate is pushed toward the opening of the cutting head and away from the jaws by pressure of the finger or thumb on an ejecting arm 26 which is pivoted at 27 to the knob 7 and extends from said knob to the slotted perforated ears 28 on the ejecting plate exterior of the cutting jaws. A pin 29 completes the connection between this ejecting arm and the ejecting plate, and it will be apparent that when the thumb is pressed on the ejecting arm to move said arm and the ejecting plate to dotted position of Figure 4, the ice cream segment will be forced through the open cutter head or ring 1 to be deposited in the waiting receptacle.

Having thus fully described my invention, what I claim as new and desire to secure by Letters Patent is—

1. The combination with an open cutter head having a transverse arch bar and a pair of cutting jaws pivoted on said bar, of means for actuating said jaws, and means for ejecting a segment of ice cream from said jaws through the open center cutter head.

2. The combination with an open circular cutter head having a transversely disposed semi-circular cutter bar, of a pair of segmental cutting jaws pivoted on said bar and adapted to swing through arcs of ninety degrees within said cutter head, and means for actuating said jaws.

3. The combination with an open circular cutter head having a transversely disposed arched cutter bar and a pair of segmental cutting jaws pivoted on said bar, of a shank and handle, and means for operating said cutting jaws.

4. The combination with an open circular cutter head having a rigid shank, stem and handle, of a transverse arch bar on said head, a pair of segmental cutting jaws pivoted on said bar, a draw head on the stem, a lever pivoted in the shank and operatively connected to said draw head at one end, and push links connecting the other end of said lever with said cutting jaws.

5. The combination with an open circular cutter head having a transversely disposed arch bar, a pair of segmental cutter jaws and means for operating said jaws, of an ejecting plate within said jaws, and means for actuating said plate as described.

In testimony whereof I affix my signature.

FRED N. MARTIN.